(12) United States Patent
Manning

(10) Patent No.: US 6,255,886 B1
(45) Date of Patent: *Jul. 3, 2001

(54) METHOD FOR PROTECTING AN INTEGRATED CIRCUIT DURING BURN-IN TESTING

(75) Inventor: Troy Manning, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 09/560,378

(22) Filed: Apr. 28, 2000

Related U.S. Application Data

(60) Continuation of application No. 08/841,990, filed on Apr. 8, 1997, now Pat. No. 6,057,725, which is a division of application No. 08/418,143, filed on Apr. 5, 1995, now Pat. No. 5,642,073, which is a continuation-in-part of application No. 08/164,163, filed on Dec. 6, 1993, now Pat. No. 5,493,249.

(51) Int. Cl.⁷ ............................................. H03K 5/08
(52) U.S. Cl. ............................................ 327/325; 327/321
(58) Field of Search .................................... 327/309, 314, 327/320, 321, 325; 365/189.06, 201, 226

(56) References Cited

U.S. PATENT DOCUMENTS

| | | | |
|---|---|---|---|
| 4,583,157 | 4/1986 | Kirsch et al. | 363/60 |
| 4,631,421 | 12/1986 | Inoue et al. | 307/297 |
| 4,729,873 | 3/1988 | Shulz . | |
| 4,733,108 | 3/1988 | Truong | 307/296 |
| 4,807,104 | 2/1989 | Floyd et al. | 363/59 |
| 4,843,256 | 6/1989 | Scade et al. | 307/296.2 |
| 4,874,967 | 10/1989 | Deane | 307/296.8 |

(List continued on next page.)

FOREIGN PATENT DOCUMENTS

| | | | |
|---|---|---|---|
| 904787 | 9/1986 | (BE) . | |
| 322033 | 2/1991 | (DE) . | |
| 322034 | 2/1991 | (DE) . | |
| 322036 | 2/1991 | (DE) . | |
| 322051 | 2/1991 | (DE) . | |
| 4324638 | 2/1994 | (DE) | H01L/21/28 |
| 558004 | 9/1993 | (EP) | H01L/21/28 |
| 2177422 | 1/1987 | (GB) . | |
| 55-25220 | 2/1980 | (JP) | H03K/19/08 |
| 59-65467 | 4/1984 | (JP) | H01L/27/10 |
| 2-302076 | 12/1990 | (JP) | H01L/27/04 |
| 04175199 | 6/1992 | (JP) | B32B/33/00 |
| 9410703 | 5/1994 | (WO) | H01L/21/90 |

Primary Examiner—Terry D. Cunningham
(74) Attorney, Agent, or Firm—Fletcher, Yoder & Van Someren

(57) ABSTRACT

A multi-phase charge pump continuously pumps to establish a DC voltage outside the range of supply and reference voltages. The multi-phase charge pump in one embodiment includes four stages operating in a ring with a four-phase clock. Each stage includes a three-mode charge pump that generates and provides reset and control signals to other stages. Each stage includes a pass transistor having a gate driven in excess of the DC voltage for efficient transfer of charge. The gate drive signal from a first stage is coupled to a next stage in the ring where it is used to generate the next gate drive signal. Each gate drive signal corresponds to one waveform having a phase skewed in time so that each stage in the ring is operating in a different mode. In a method of use, a first stepped voltage is developed on a first capacitor and selectively coupled to a second capacitor to develop a second stepped voltage of greater absolute value. The second stepped voltage gates charge transfer from a first stage and enables the selective coupling in a next stage in a sequence of pump stages. The pump stages include protection circuits protecting high-voltage nodes during burn-in testing. The charge pump includes a burn-in detector circuit for detecting burn-in conditions and for turning on the protection circuits and a pump regulator for regulating the output of the charge pump.

20 Claims, 11 Drawing Sheets

U.S. PATENT DOCUMENTS

| | | | |
|---|---|---|---|
| 4,961,007 | 10/1990 | Kumanoya et al. | 307/296.2 |
| 4,970,409 | 11/1990 | Wada et al. | 307/296.1 |
| 5,029,282 | 7/1991 | Ito | 307/296.8 |
| 5,034,625 | 7/1991 | Min et al. | 307/296.2 |
| 5,093,279 | 3/1992 | Andreshak et al. | |
| 5,179,296 | 1/1993 | Ito | 307/296.2 |
| 5,180,928 | 1/1993 | Choi | 307/296.6 |
| 5,182,468 | 1/1993 | Erdelyi et al. | 307/296.1 |
| 5,196,996 | 3/1993 | Oh | 363/60 |
| 5,202,588 | 4/1993 | Matsuo et al. | 307/296.2 |
| 5,262,354 | 11/1993 | Cote et al. | |
| 5,266,842 | 11/1993 | Park | 307/296.2 |
| 5,281,549 | 1/1994 | Fazan et al. | 437/52 |
| 5,301,097 | 4/1994 | McDaniel | 363/60 |
| 5,304,859 | 4/1994 | Arimoto | 307/296.2 |
| 5,343,088 | 8/1994 | Jeon | 307/296.2 |
| 5,371,047 | 12/1994 | Greco et al. | |
| 5,448,199 | 9/1995 | Park | 327/546 |
| 5,510,749 | 4/1996 | Arimoto | 327/546 |
| 5,528,189 | 6/1996 | Khatibzadeh | 327/314- |

METHOD FOR PROTECTING AN INTEGRATED CIRCUIT DURING BURN-IN TESTING

CROSS-REFERENCES TO RELATED APPLICATIONS

This application is a Continuation of application Ser. No. 08/841,990, filed on Apr. 8, 1997, now U.S. Pat. No. 6,057,725 which is a Divisional of application Ser. No. 08/418,143, filed Apr. 5, 1995, now U.S. Pat. No. 5,642,073, which is a Continuation-In-Part of Ser. No. 08/164,163, filed Dec. 6, 1993, now U.S. Pat. No. 5,493,249.

BACKGROUND OF THE INVENTION

1. Field of the Invention

This invention relates to supplying power to a circuit and particularly to systems including pumped power supplies.

2. Description of Related Art

System designs are routinely constrained by a limited number of power supply voltages ($V_{cc}$). For example, consider a portable computer system powered by a conventional battery having a limited power supply voltage. For proper operation, different components of the system, such as a display, a processor, and memory employ several technologies which require power to be supplied at various operating voltages. Components often require operating voltages of a greater magnitude than the power supply voltage or in other cases involve a voltage of reverse polarity. The design of a system, therefore, includes power conversion circuitry to efficiently develop the required operating voltages. One such power conversion circuit is known as a charge pump.

The demand for highly-efficient and reliable charge pump circuits has increased with the increasing number of applications utilizing battery powered systems such as notebook computers, portable telephones, security devices, battery backed data storage devices, remote controls, instrumentation, and patient monitors, to name a few.

Inefficiencies in conventional charge pumps lead to reduced system capability and lower system performance in both battery and non-battery operated systems. Inefficiency can adversely affect system capabilities causing limited battery life, excess heat generation, and high operating costs. Examples of lower system performance include low speed operation, excessive delays in operation, loss of data, limited communication range, and the inability to operate over wide variations in ambient conditions including ambient light level and temperature.

Product reliability is a product's ability to function within given performance limits, under specified operating conditions over time. "Infant mortality" is the failure of an integrated circuit (IC) early in its life due to manufacturing defects. Limited reliability of a charge pump can affect the reliability of the entire system.

To reduce infant mortality, new batches of IC devices (e.g., charge pumps) are "burned-in" before being shipped to customers. Burn-in is a process designed to accelerate the occurrence of those failures which are commonly at fault for infant mortality. During the burn-in process, the ICs are dynamically stressed at high temperature (e.g., 125° C.) and higher-than-normal voltage (for example, 7 volts for a 5 volt device) in cycles that can last several hours or days. The devices can be tested for functionality before, after, and even during the burn-in cycles. Those devices that fail are eliminated.

Conventional pump circuits are characterized by a two part cycle of operation and low duty cycle. Pump operation includes pumping and resetting. Duty cycle is low when pumping occurs at less than 50% of the cycle. Low duty cycle consequently introduces low frequency components into the output DC voltage provided by the pump circuit. Low frequency components cause interference between portions of a system, intermittent failures, and reduced system reliability. Some systems employ a conventional pump circuits include filtering circuits at additional cost, circuits to operate the pump at elevated frequency, or both. Elevated frequency operation in some cases leads to increased system power dissipation with attendant adverse effects.

During normal operation of a charge pump, especially charge pumps providing operating voltages higher than $V_{CC}$ (boosted voltages), certain internal "high-voltage" nodes in the charge pump circuitry reach voltages (over-voltages) having a magnitude significantly higher than either the power-supply voltage or the produced operating voltage. These over-voltages can reach even higher levels under the higher-than-normal voltages used during burn-in testing. When an IC charge pump is tested during a burn-in cycle, high burn-in over-voltages in combination with high burn-in temperatures can cause oxidation of silicon layers of the IC device and can permanently damage the charge pump.

In addition to constraints on the number of power supply voltages available for system design, there is an increasing demand for reducing the magnitude of the power supply voltage. The demand in diverse applications areas could be met with high efficiency charge pumps that operate from a supply voltage of less than 5 volts.

Such applications include memory systems backed by 3 volt standby supplies, processors and other integrated circuits that require either reverse polarity substrate biasing or booted voltages outside the range 0 to 3 volts for improved operation. As supply voltage is reduced, further reduction in the size of switching components paves the way for new and more sophisticated applications. Consequently, the need for high efficiency charge pumps is increased because voltages necessary for portions of integrated circuits and other system components are more likely to be outside a smaller range.

In view of the problems described above and related problems that consequently become apparent to those skilled in the applicable arts, the need remains, in methods for supplying power to a circuit and particularly in systems including pumped power supplies, for alternatives to the conventional pump circuit having low efficiency, low duty cycle operation, resistance to over-voltage damage and only practically operable from voltages of 5 volts and above.

SUMMARY OF THE INVENTION

Accordingly, a system in one embodiment of the present invention includes an operational circuit and a voltage generator for supplying power to the operational circuit. The voltage generator includes an oscillator, and a plurality of charge pump circuits forming one multi-phase charge pump. In operation, each pump circuit of the plurality, in response to the oscillator, provides power to the operational circuit for a time, and enables a next pump circuit of the plurality to supply power at another time.

According to a first aspect of such a system, power is supplied to the operational circuit in a manner characterized by continuous pumping, thereby supplying higher currents. The charge pump circuits can be designed so that the voltage generator provides either positive or negative output voltages.

According to another aspect, the plurality of pumps cooperate to provide a 100% pumping duty cycle. Switching artifacts, if any, on the pumped DC voltage supplied to the operational circuit are of lower magnitude and are at a frequency more easily removed from the pumped DC voltage.

According to another aspect, a signal in a first pump circuit is generated for enabling a second pump circuit of the plurality. By using the generated signal for pump functions in a first pump and for enabling a second pump, additional signal generating circuitry in each pump is avoided.

According to another embodiment of the present invention, each pump circuit includes a pass transistor for selectively coupling a charged capacitor to the operational circuit when enabled by a control signal. By selectively coupling, each pump circuit is isolated at a time when the pump is no longer efficiently supplying power to the operational circuit.

According to another aspect, each pump of the plurality operates at improved efficiency compared to prior art pumps, especially in MOS integrated circuit applications wherein the margin between the power supply voltage ($V_{CC}$) and the threshold voltage ($V_t$) of the pass transistor is less than about 0.6 volts. Greater efficiency is achieved by driving the pass transistor gate at a voltage further out of the range between ground and $V_{CC}$ voltages than the desired pump voltage is outside such range.

According to another aspect of such an embodiment, the control signal is developed as a result of developing a first stepped voltage and using the first stepped voltage to develop a second stepped voltage of increased absolute value.

In yet another embodiment, an integrated circuit includes a multi-phase charge pump, each stage of which includes a FET as a pass transistor. The substrate of the integrated circuit is pumped to a bias voltage having a polarity opposite the polarity of the power signal, $V_{CC}$, from which the integrated circuit operates. By developing a control signal as the result of a first stepped voltage and a second stepped voltage, and applying the control signal to the gate of the FET, efficient coupling of a pumped charge to the substrate results. High-voltage nodes of the integrated circuit can be coupled to protection circuits which clamp down overvoltages during burn-in testing, thus allowing accurate burn-in testing while preventing over-voltage damage.

In a preferred embodiment of the present invention, the protection circuit is built as part of a charge pump integrated circuit which supplies a boosted voltage to the system. The charge pump has at least one high-voltage node. Protection circuits are coupled to each high-voltage node. Each protection circuit includes a switching element and a voltage clamp coupled in series. The voltage clamp also couples to the high-voltage node, while the switching element can also couple to a reference voltage source. A burn-in detector couples to the switching element and to the charge pump circuit and detects burn-in conditions. During burn-in testing, the switch element responds to a signal from the burn-in detector and activates the voltage clamp. The voltage clamp then clamps down the voltage of the high-voltage node, thus avoiding over-voltage damage.

This preferred embodiment of the system also includes a pump regulator for monitoring the boosted voltage. The pump regulator produces an output signal VCCPREG, which is used as a control signal for turning on and off the oscillator.

The present invention may be practiced according to a method for powering a circuit, the method in one embodiment includes the steps of:

(1) maintaining a first voltage on a first plate of a first capacitor while storing a first charge on a second plate of the first capacitor;

(2) stepping the voltage on the first plate of the first capacitor thereby developing a first stepped voltage on the second plate of the first capacitor;

(3) coupling the first stepped voltage to a pass transistor for selective conduction to the circuit;

(4) maintaining a second voltage on a first plate of a second capacitor while storing a second charge on a second plate of the second capacitor;

(5) stepping the voltage on the first plate of the second capacitor thereby developing a second stepped voltage on the second plate of the second capacitor;

(6) coupling the second stepped voltage to the first plate of a third capacitor;

(7) stepping the voltage on the second plate of the third capacitor thereby developing a third stepped voltage on the first plate of the third capacitor; and (8) coupling the third stepped voltage to a control terminal of the pass transistor thereby selectively enabling the first stepped voltage to power the circuit.

According to a first aspect of such a method as applied to a substrate bias generator of an integrated circuit, the control terminal of the pass transistor is taken to a voltage having sufficient magnitude for efficient biasing of the substrate through the pass transistor.

These and other embodiments, aspects, advantages and features of the present invention will be set forth in part in the description which follows, and in part will become apparent to those skilled in the art by reference to the following description of the invention and referenced drawings or by practice of the invention. The aspects, advantages, and features of the invention are realized and attained by means of instrumentalities, procedures, and combinations particularly point out in the appended claims.

In each functional block diagram, a signal line with an arrow represents a group of signals. A single line between functional blocks represent one or more signals coupled in any manner by any number of conductors.

Signals that appear on several figures and have the same mnemonic are directly or indirectly coupled together. A signal named with a mnemonic and a second signal named with the same mnemonic followed by an asterisk are related by logic inversion.

In each timing diagram the vertical axis represents analog voltage levels for analog signals and binary logic levels for logic signals. The horizontal axis represents time. A person having ordinary skill in the art will recognize where portions of a diagram have been expanded to improve the clarity of the presentation. The vertical axis is intended to show the transition from active (asserted) to passive (non-asserted) levels for each logic signal and a summary of characteristic values for each analog signal. The voltages corresponding to the logic levels of the various signals are not necessarily identical among the various logic signals.

DETAILED DESCRIPTION OF A PREFERRED EMBODIMENT

Figures 1, 2:
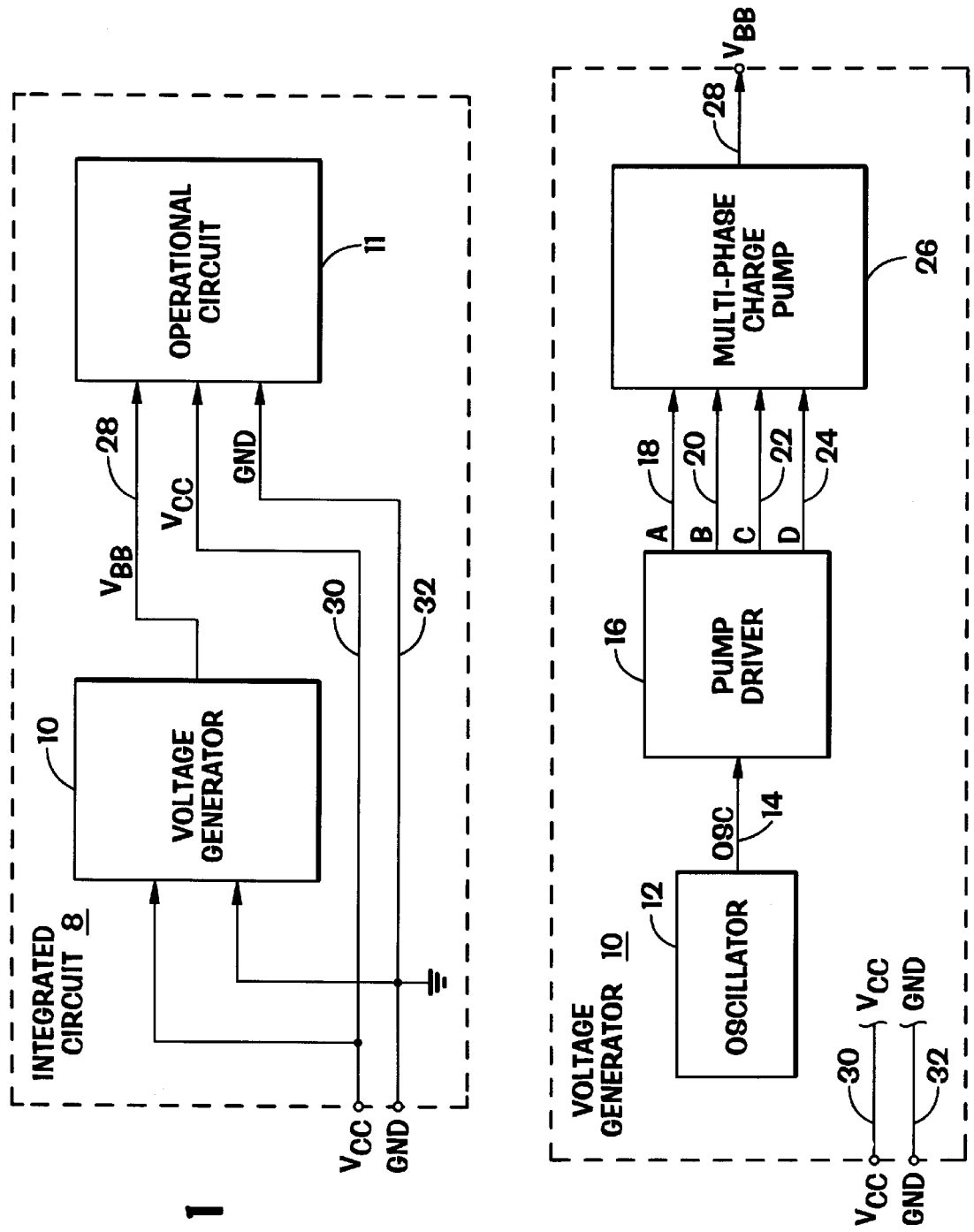
FIG. 1 is a functional block diagram of an integrated circuit of the present invention.
FIG. 2 is a functional block diagram of voltage generator 10 shown in FIG. 1.

FIG. 1 is a functional block diagram of an integrated circuit of the present invention. Integrated circuit 8 includes voltage generator 10 and operational circuit 11 formed on a substrate. Integrated circuit 8 receives power signal $V_{CC}$ on line 30 and a ground reference signal GND on line 32. A DC voltage therebetween provides operating current to voltage generator 10 and operational circuit 11, thereby powering integrated circuit 8.

Power supplied to integrated circuit 8 is converted by voltage generator 10 to an intermediate voltage $V_{BB}$. The voltage signal $V_{BB}$ has a magnitude outside the range from GND to $V_{CC}$. For example, when the voltage of signal $V_{CC}$ is 3.3 volts referenced to GND, the voltage of signal $V_{BB}$ in one embodiment is about −1.5 volts and in another embodiment is about −5.0 volts. Voltages of opposite polarity are used as substrate bias voltages for biasing the substrate in one embodiment wherein integrated circuit 8 is fabricated with a MOS or CMOS process. Further, when the voltage of signal $V_{CC}$ is 3.3 volts referenced to GND, the voltage of signal $V_{BB}$ in still another embodiment is about 4.8 volts. Voltages in excess of $V_{CC}$ are called boosted (and are sometimes referred to by the nomenclature $V_{CCP}$) and are used, for example, in memories for improved access speed and more reliable data storage.

Operational circuit 11 performs a function of integrated circuit 8. The present invention is independent of the nature of the function performed. Examples of the wide variety of possible functions include data processing, computing, data storage, measurement, control, display, sensing, timing, switching, amplification, and communication functions.

Integrated circuit 8 is an example of a system of the present invention that includes a power supply for generating a voltage for use in the system. The voltage generator in such a system generates a pumped signal that may be used to provide power or to bias other portions of the system used as a reference for system functions, or used to control the operation of portions of the system. In systems of the present invention, the voltage generator provides a voltage for use in the system that is outside the range of voltages supplied to the system.

FIG. 2 is a functional block diagram of voltage generator 10 shown in FIG. 1. Voltage generator 10 receives power and reference signals $V_{CC}$ and GND on lines 30 and 32, respectively, for operating oscillator 12, pump driver 16, and multi-phase charge pump 26. Oscillator 12 generates a timing signal OSC on line 14 coupled to pump driver 16. Control circuits, not shown, selectively enable oscillator 12 in response to an error measured between the voltage of signal $V_{BB}$ and a target value. Thus, when the voltage of signal $V_{BB}$ is not within an appropriate margin of the target value, the oscillator 12 is enabled for reducing the error. The oscillator 12 is then disabled until the voltage of signal $V_{BB}$ again is not within the margin.

Pump driver 16, in response to signal OSC on line 14, generates timing signals A, B, C, and D, on lines 18–24, respectively. Pump driver 16 serves as a clocking circuit coupled in series between oscillator 12 and multi-phase charge pump 26. Timing signals A, B, C, and D are non-overlapping. Together they organize the operation of multi-phase charge pump 26 according to four clock phases. Separation of the phases is better understood from a timing diagram.

Figure 3:
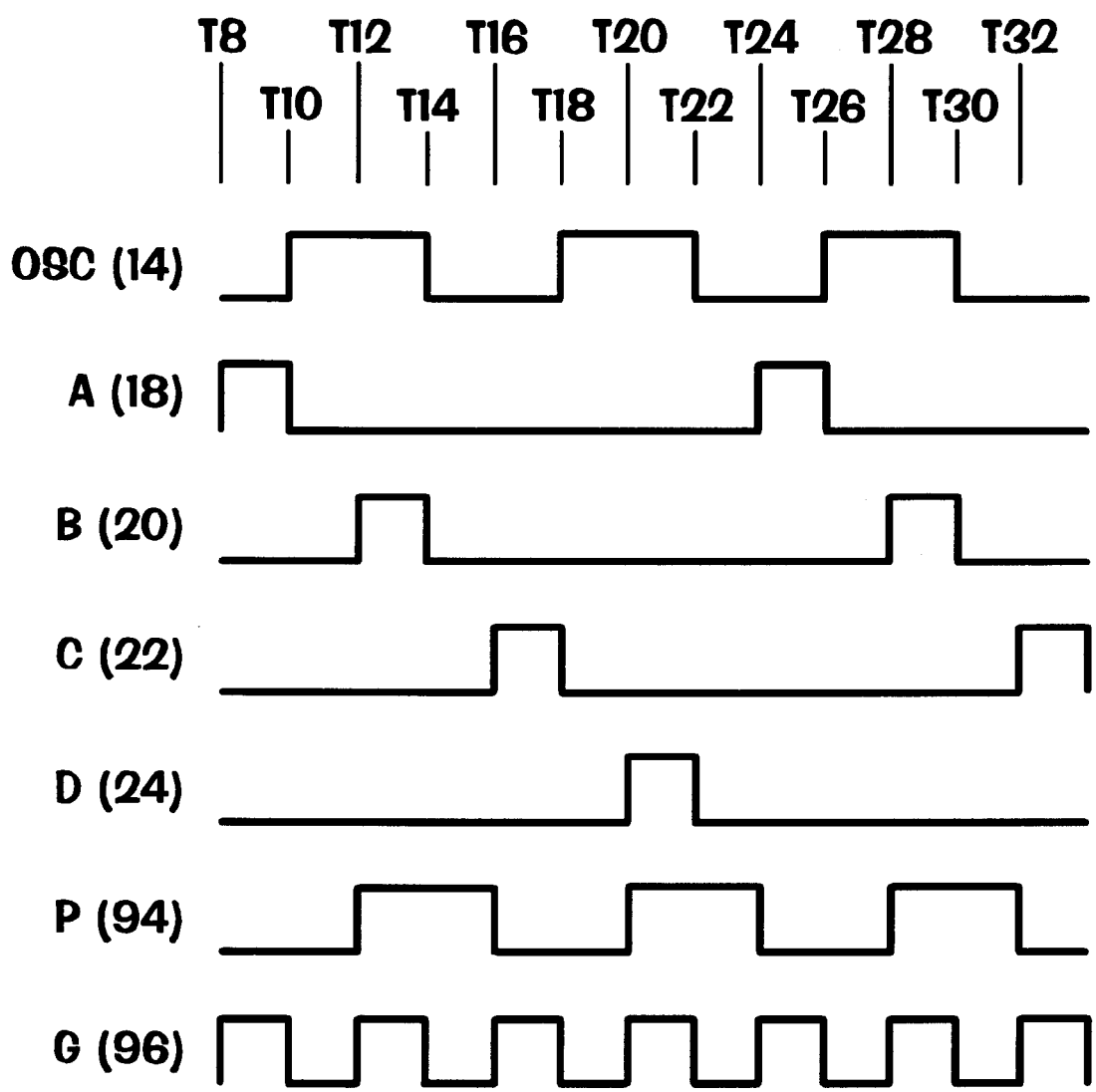
FIG. 3 is a timing diagram of signals shown on FIGS. 2 and 4.
Figure 4:
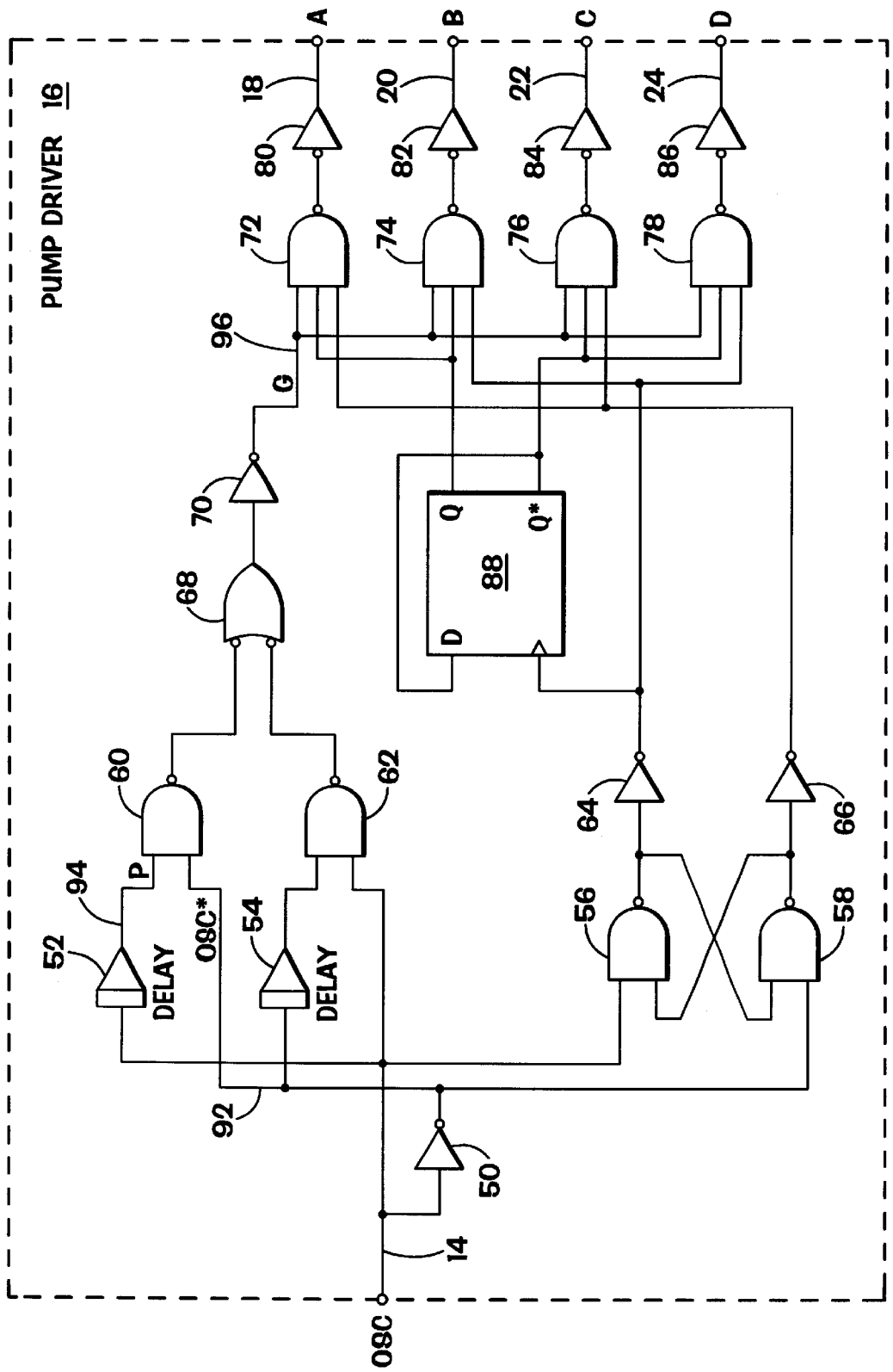
FIG. 4 is a schematic diagram of pump driver 16 shown on FIG. 2.

FIG. 3 is a timing diagram of signals shown on FIGS. 2 and 4. Timing signals A, B, C, and D, also called clock signals, are non-overlapping logic signals generated from intermediate signals P and G. Signal OSC is an oscillating logic waveform. Signal P is the delayed waveform of signal OSC. Signal G is the logic inverse of the exclusive OR of signals OSC and P. The extent of the delay between signals OSC and P determines the guard time between consecutively occurring timing signals A, B, C, and D. The extent of delay is exaggerated for clarity. In one embodiment, signal OSC oscillates at about 40 MHz and the guard time is about 3 nanoseconds. Signal transitions at particular times will be discussed with reference to a schematic diagram of an implementation of the pump driver.

FIG. 4 is a schematic diagram of pump driver 16 shown on FIG. 2. Pump driver 16 includes means for generating gate signal G on line 96; a first flip flop formed from gates 56, 58, 64, and 66; a second flip flop 88; and combinational logic.

Signal G on line 96 operates to define non-overlapping timing signals. Means for generating signal G include gate 50, delay elements 52 and 54, and gates 60, 62, 68 and 70. Delay elements 52 and 54 generate signals skewed equally in time. Referring to FIG. 3, signal OSC rises at time T10. At time T12, signal P on line 94 rises after the delay accomplished by element 52. Inverted oscillator signal OSC* on line 92 is similarly delayed through element 54. The remaining gates form signal G from the logic inverse of the exclusive OR of signal OSC and signal P according to principles well known in the art. Signal G on line 96 rises and remains high from time T12 to time T14 so that one of the four flip flop outputs drives one of the timing signal line 18–24. First and second flip flops operate to divide signal OSC by four to form symmetric binary oscillating waveforms on flip flop outputs from gates 64 and 66 and from flip flop 88. The logic combination of appropriate flip flop outputs and signal G produces, through gates 72–78, the non-overlapping timing signals A, B, C, and D as shown in FIG. 3. Gates 80–86 provide buffering to improve drive characteristics, and invert and provide signals generated by gates 72–78 to charge pump circuits to be discussed below. Buffering overcomes intrinsic capacitance associated with layout of the coupling circuitry between pump driver 16 and multi-phase charge pump 26, shown in FIG. 2.

Figure 5:
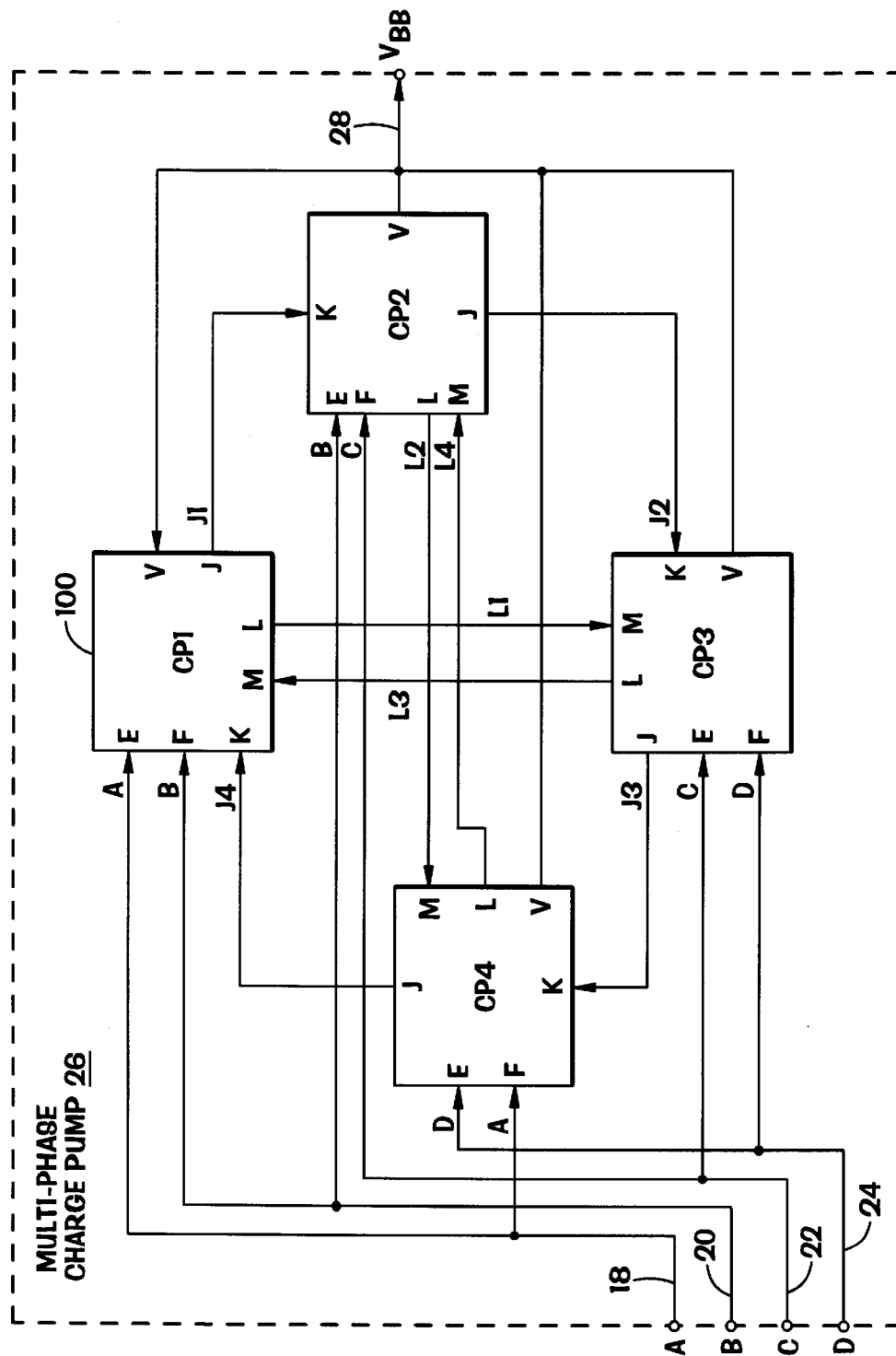
FIG. 5 is a functional block diagram of multi-phase charge pump 26 in FIG. 2.

FIG. 5 is a functional block diagram of multi-phase charge pump 26 shown in FIG. 2. Multi-phase charge pump 26 includes four identical charge pump circuits identified as charge pumps CP1–CP4 and inter-connected in a ring by signals J1–J4. The output of each charge pump is connected in parallel to line 28 so that signal $V_{BB}$ is formed by the cooperation of charge pumps CP1–CP4. Timing signals A, B, C, and D are coupled to inputs E and F of each charge pump in a manner wherein no charge pump receives the same combination of timing signals. Consequently, operations performed by charge pump CP1 in response to timing signals A and B at a first time shown in FIG. 3 from time T8 to time T14 will correspond to operations performed by charge pump CP2 at a second time from time T12 to time T18.

Each charge pump has a mode of operation during which primarily one of three functions is performed: reset, share, and drive. Table 1 illustrates the mode of operation for each charge pump during the times shown on FIG. 3.

| | | Mode of Operation | | | |
|---|---|---|---|---|---|
| Period | Times | CP1 | CP2 | CP3 | CP4 |
| 1 | T14–T18 | reset | drive | share | reset |
| 2 | T18–T22 | reset | reset | drive | share |
| 3 | T22–T26 | share | reset | reset | drive |
| 4 | T26–T30 | drive | share | reset | reset |

During the reset mode, storage elements in the charge pump are set to conditions in preparation for the share mode. In the share mode, charge is shared among storage elements to develop voltages needed during the drive mode. During the drive mode, a charge storage element that has been pumped to a voltage designed to established the voltage of signal $V_{BB}$ within an appropriate margin is coupled to line 28 to power operational circuit 11.

Power is supplied via line 28 by multi-phase charge pump 26 as each charge pump operates in drive mode. Each charge pump is isolated from line 28 when in reset and share modes. As will be discussed in greater detail with reference to FIG. 7, each charge pump generates a signal for enabling another pump of multi-phase charge pump 26 to supply power. Such a signal, as illustrated in FIG. 5 includes two signals, J and L, generated by each pump. In alternate embodiments, enablement is accomplished by one or more signals individually or in combination.

Enabling a charge pump in one embodiment includes enabling the selective coupling of a next pump to line 28. In other alternate embodiments, enabling includes providing a signal for selectively controlling the mode of operation or selectively controlling the function completed during a mode of operation, or both. Such control is accomplished by generating and providing a signal whose function is not primarily to provide operating power to another pump.

Charge pumps CP1–CP4 are arranged in a sequence having "next" and "prior" relations among charge pumps. Because charge pump CP2 receives a signal J1 generated by charge pump CP1, charge pump CP1 is the immediately prior pump of CP2 and, equivalently, CP2 is the immediately next pump of CP1. In a like manner, with respect to signal J2, charge pump CP3 is the immediately next pump of CP2. With respect to signals J3 and J4, and by virtue of the fact that signal J1–J4 form a ring, charge pump CP4 is the immediately prior pump of CP1 and charge pump CP3 is a prior pump of the immediate prior pump of CP1. Signals L1–L4 are coupled to pumps beyond the immediate next pump. Consequently, charge pump CP3 receives signal L1 from a prior pump (CP1) of the prior pump (CP2); and provides signal L3 to a next pump (CP1) of the next pump (CP4). Charge pumps CP1–CP4 are numbered according to their respective sequential positions 1–4 in the ring.

In alternate embodiments, one or more additional charge pumps are coupled between a given charge pump and a next charge pump without departing from the concept of "next pump" taught herein. A next pump need not be an immediate next pump. A prior pump, likewise, need not be an immediately prior pump.

The operation of each charge pump, e.g. CP1, is coordinated by timing signals received at inputs E and F, timing signals received at inputs M and K. Due to the fact that pump circuits are identical and that timing signals A–D are coupled to define four time periods, each period including two clock phases, signals J1–J4 all have the same characteristic waveform, occurring at a time according to the sequential position 1–4 of the pump from which each signal is generated. Signals L1–L4, in like manner, all have a second characteristic waveform, occurring according to the generating charge pump's sequential position.

In an alternate and equivalent embodiment, the sequence of charge pumps illustrated as CP1–CP4 in FIG. 5 does not form a ring. The first pump in the sequence does not receive a signal generated by the last charge pump in the sequence. The sequence in other equivalent embodiments includes fewer or more than four charge pumps. Those skilled in the art can apply the principles of the present invention to various organizations and quantities of cooperating charge pumps without departing from the scope of the present invention. In an alternate embodiment, for example, an alternate pump driver provides a three phase timing scheme with three clock signals similar to signals A–C. An alternate multi-phase charge pump in such an embodiment includes six charge pumps in three pairs arranged in a linear sequence coupled in parallel to supply signal $V_{BB}$.

In yet another alternate embodiment, the timing and intermittent operation functions of oscillator 12 are implemented by a multi-stage timing circuit formed in a series of stages, each charge pump including one stage. In such an embodiment, the multi-stage timing circuit performs the functions of pump driver 16. The multi-stage timing circuit is implemented in one embodiment with delay elements arranged with positive feedback. In another embodiment, each stage includes retriggerable monostable multivibrator. In still another embodiment, delay elements sense an error measured between the voltage of signal $V_{BB}$ and a target value. In yet another embodiment, less than all charge pumps include a stage of the multi-stage timing circuit.

Figure 6:
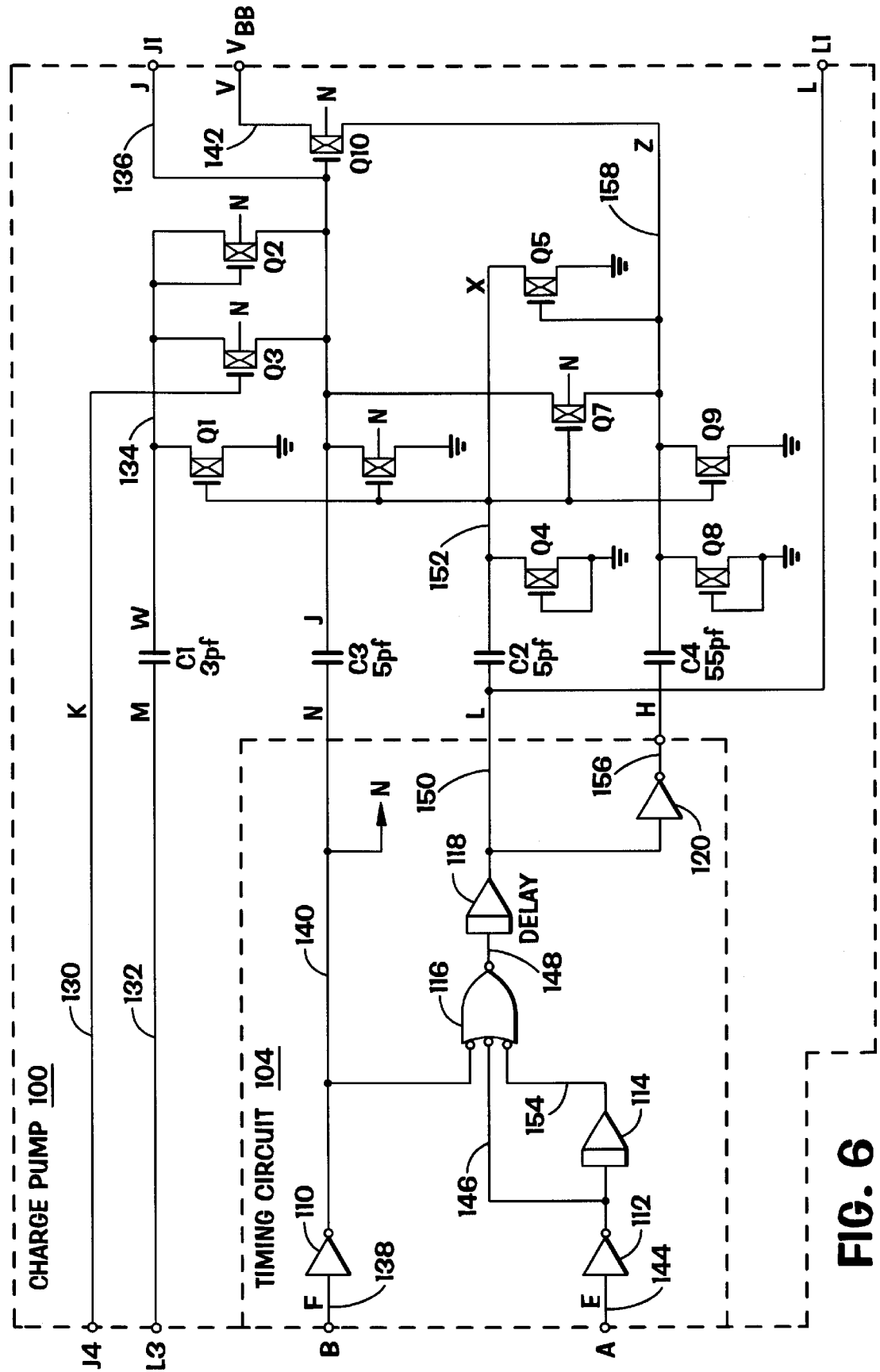
FIG. 6 is a schematic diagram of charge pump 100 shown in FIG. 5.

FIG. 6 is a schematic diagram of charge pump 100 shown in FIG. 5. Charge pump 100 includes a timing circuit 104; a start-up conditions circuit (Q4 and Q8) for establishing start-up conditions; a primary storage capacitor (C4) or other primary storage means; a control circuit responsive to timing signal K for generating a second timing signal J (Q2 and Q3); a transfer circuit responsive to signals M and N for selectively transferring charge from the primary storage means to the operational circuit (C1, C3, Q2, Q3, and Q10); reset means, responsive to timing signal L, for establishing charges on each capacitor in preparation for a subsequent mode of operation (C2, Q1, Q6, Q7, and Q9); and a transistor Q5 for resetting the reset pump C2.

Values of components shown in FIG. 6 illustrate one embodiment of the present invention, an integrated circuit dynamic random access memory (DRAM) having voltage generator for supplying a substrate bias voltage. In such an embodiment $V_{CC}$ is about 3.0 volts, $V_{BB}$ is about −1.2 volts, signal OSC has a frequency of 40 MHz and each pump circuit (e.g., CP1) supplies about 5 milliamps in drive mode. In similar embodiments the frequency of signal OSC is in a range 1 to 50 MHz and each pump circuit supplies current in the range 1 to 10 milliamps.

Simulation analysis of charge pump 100 using the component values illustrated in FIG. 6 shows that for $V_{CC}$ as low as 1.7 volts and $V_T$ of about 1 volt, an output current of about 1 milliamp is generated. Not only do prior art pumps cease operating at such low values of $V_{CC}$, but output current is about five times lower. A prior art pump operating at a minimum $V_{CC}$ of 2 volts generates only 100–200 microamps.

P-channel transistors Q2, Q3, Q6, Q7, and Q10 are formed in a well biased by signal N. The bias decreases the voltage apparent cross junctions of each transistor, allowing smaller dimensions for these transistors.

A modified charge pump having an output voltage $V_{BB}$ greater than $V_{CC}$ includes an n-channel transistor for all p-channel transistors shown in FIG. 6. Proper drive signal N, L, and H are obtained by introducing logic invertors on each line 140, 150, and 156. In such an embodiment, signal N is not used for biasing wells of the pump circuit since no transistor of this embodiment need be formed in a well.

Charge pump 100 corresponds to charge pump CP1 and is identical to charge pumps CP2–CP4. Signals on FIG. 6 outside the dotted line correspond to the connections for CP1 shown on FIG. 5. The numeric suffix on each signal name indicates the sequential position of the pump circuit that generated the signal. For example, signal K received as signal J4 on line 130 is generated as signal J by charge pump CP4.

When power signal $V_{CC}$ and reference signal GND are first applied, transistors Q4 and Q8 bleed residual charge off capacitors C2 and C4 respectively. Since the functions of transistors Q4 and Q8 are in part redundant, either can be eliminated, though start up time will increase. The first several oscillations of signal OSC eventually generate pulses on signals A, B, C, and D. Signals C and D, coupled to the equivalent of timing circuit 104 in charge pump CP3, form signal L3 input to CP1 as signal M. Signals D and A, coupled to the equivalent of timing circuit 104 in charge pump CP4, contribute to the formation of signal J4. In approximately two occurrences of each signal A–D, all four charge pumps are operating at steady state signal levels. Steady state operation of charge pump 100 in response to input timing and control signals J4 (K) and L3 (M), and clock signals A (E) and B (F) is best understood from a timing diagram.

Figure 7:
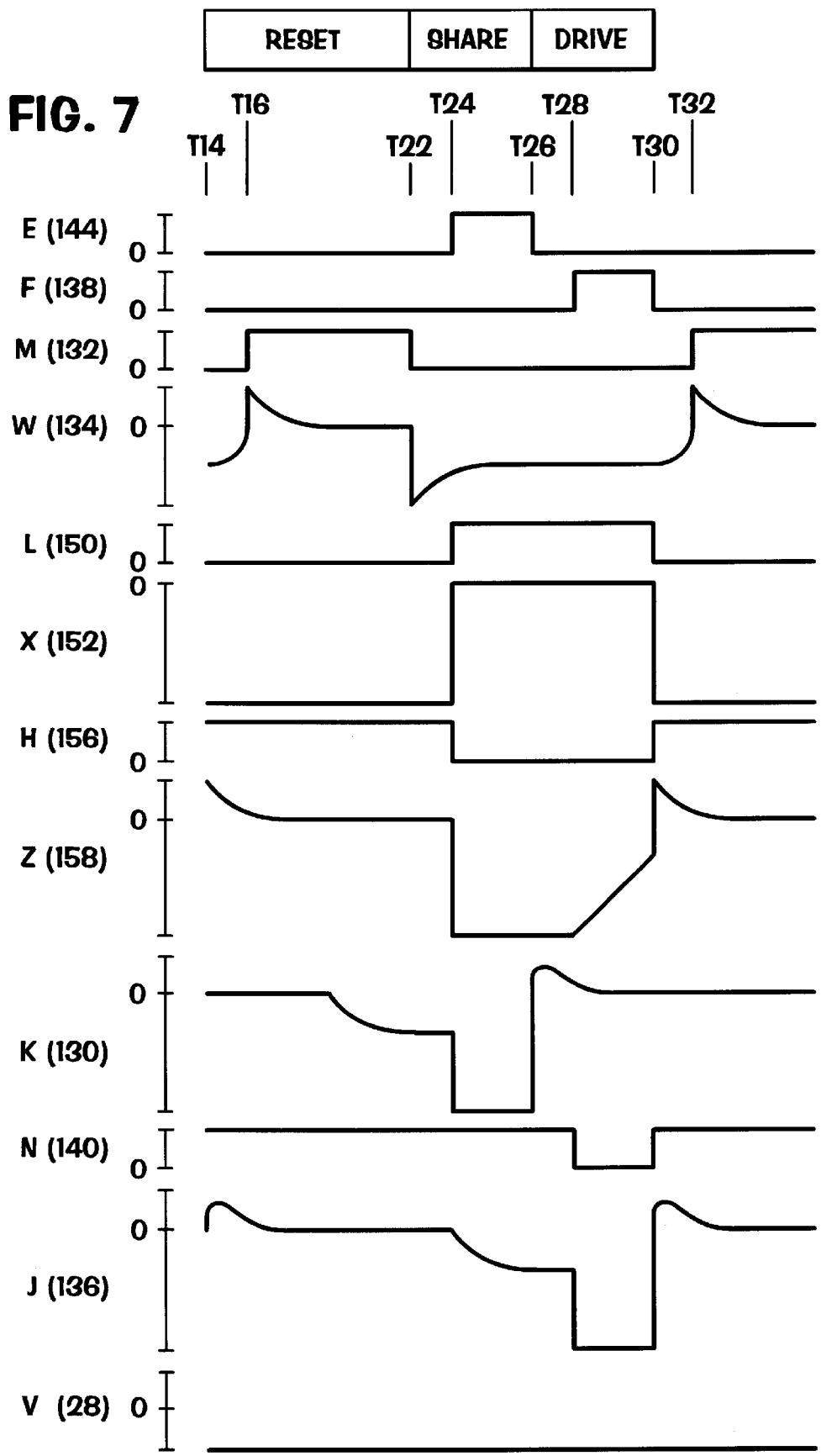
FIG. 7 is a timing diagram of signals shown in FIG. 6.

FIG. 7 is a timing diagram of signals shown in FIG. 6. The times identified on FIG. 7 correspond to similarly identified times on FIG. 3. In addition, events at time T32 corresponds to events at time T16 due to the cyclic operation of multiphase charge pump 26 of which charge pump 100 is a part.

During the period from time T14 to time T22, pump 100 performs functions of reset mode. At time T14, signal X falls turning on reset transistor Q1, Q6, Q7, and Q9. Transistor Q1 draws the voltage on line 134 to ground as indicated by signal W. Transistor Q6 when on draws the voltage of signal J to ground. Transistor Q9 when on draws the voltage of signal J to ground. Transistor Q7 couples capacitors C3 and C4 so that signal Z is drawn more quickly to ground. In an alternate embodiment, one of the transistors Q6, Q7, and Q9 is eliminated to trade-off efficiency for reduced circuit complexity. In an alternate embodiment, additional circuitry couples a part of the residual charge of capacitors C1 and C3 to line 142 as a design trade-off of circuit simplicity for improved efficiency. Such additional circuitry known to those skilled in the art.

At time T16 pump 100 receives signal M on line 132. Consequently, capacitor C1, charges as indicated by signal W.

During the period from time T22 to time T26 charge pump 100 performs functions of share mode. At time T22, signal M falls and capacitor C1 discharges slightly until at time T24 signal L rises. As a consequence of the rising edge of signal L, signal X rises, turning off transistor Q1 by time T24. The extent of the discharge can be reduced by minimizing the dimensions of transistor Q1. By stepping the voltage of signal M at time T22, a first stepped signal W having a voltage below ground has been established.

At time T24, signal K falls, turning transistor Q3 on so that charges stored on capacitors C1 and C3 are shared, i.e., transferred in part therebetween. The extent of charge sharing is indicated by the voltage of signal J. The voltage of signal J at time T28 is adjusted by choosing the ratio of values for capacitors C1 and C3. Charge sharing also occurs through transistor Q2 which acts as a diode to conduct current from C3 to C1 when the voltage of signal J is more positive than the voltage of signal W. Transistor Q2 is eliminated in an alternate embodiment to trade-off efficiency for reduced complexity.

Also at time T24, signal H falls. By stepping the voltage of signal H, a second stepped signal Z having a voltage below ground has been established. Until time T28, transistor Q10 is off, isolating charge pump 100 and signal Z from line 142. While signal Z is low, transistor Q5 is turned on to draw signal X to ground. Signals L and H cooperate to force signal X to ground quickly.

At time T26, signal K rises, turning off transistor Q3. The period of time between non-overlapping clock signals E and F provides a delay between the rising edge of signal K at time T26 and the falling edge of signal N at time T28. By turning transistor Q3 off at time T26, capacitors C1 and C3 are usually isolated from each other by time T28 so that the effectiveness of signal N on signal J is not compromised.

During the period from time T28 to time T32, charge pump 100 performs functions of drive mode. At time T28 signal N falls. By stepping the voltage of signal N, a third stepped signal J is established at a voltage below the voltage of signal Z. Consequently, transistor Q10 turns on remains on until time T30. Stepped signal J, coupled to the gate of pass transistor Q10, enables efficient conduction of charge from capacitor C4 to line 142 thereby supplying power from a first time T28 to a second time T30 as indicated by the voltage of signal Z. The voltage of the resulting signal $V_{BB}$ remains constant due to the large capacitive load of the substrate of integrated circuit 8. Q10 operates as pass means for selectively conducting charge between C4 and the operational circuit coupled to line 142, in this case the substrate. In alternate and equivalent embodiments, pass means includes a bipolar transistor in addition to, or in place of, field effect transistor Q10. In yet another alternate embodiment, pass means includes a switching circuit.

The waveform of signal J, when used as signal K in a next pump of the sequence, enables some of the functions of share mode in the next pump. As used in charge pump 100, signal J is a timing signal for selectively transferring charge from charge pump 100 to between capacitors C1 and C3. By generating signal J in a manner allowing it to perform several functions, additional signals and generating circuitry therefor are avoided.

At time T30, signal F falls. Consequently, signal L falls, signal H rises, and signal N rises. Responsive to signal H, capacitor c4 recharges as indicated by the voltage of signal Z. Responsive to signals N and L, capacitors C1 and C3 begin resetting as indicated by the voltage of signal J at time T30 and equivalently, time T14.

During share and drive modes, charge pump 100 generates signal L for use as signal M in a next pump of the next pump of charge pump 100 (i.e, CP3). The waveform of signal L when high disables reset functions in share and drive modes of charge pump 100 and when used as signal M in another pump, enables functions of reset mode therein. By generating signal L in a manner allowing it to perform several functions, additional signals and generating circuitry therefor are avoided.

Timing circuit 104 includes buffers 110, 112, and 120; gate 116; and delay elements 114 and 118. Buffers provide logical inversion and increased drive capability. Delay element 114 and gate 116 cooperate as means for generating timing signal L having a waveform shown on FIG. 7. Delay element 118 ensures that signal N falls before signal L falls to preserve the effectiveness of signal J at time T30.

Figure 8:
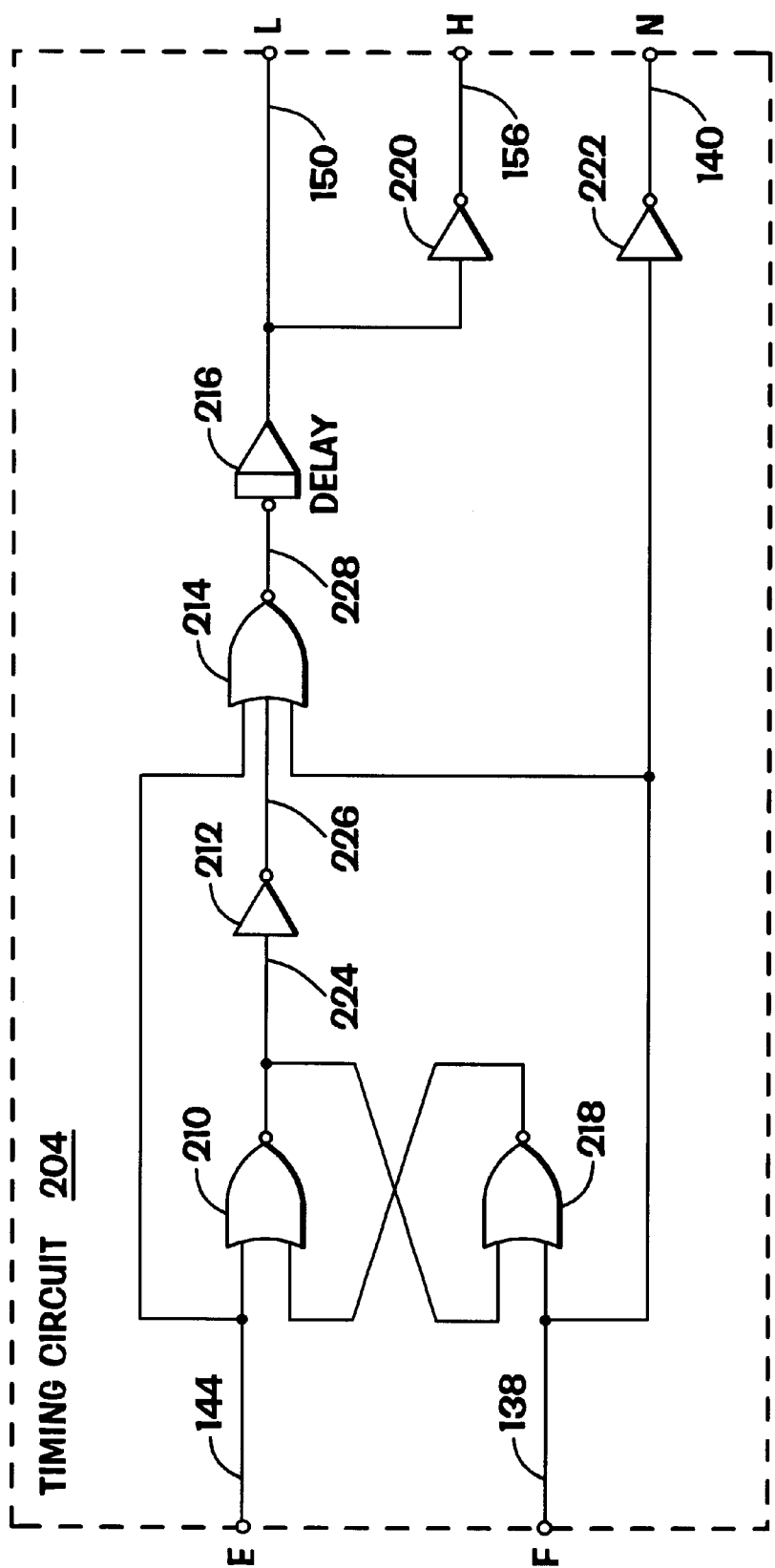
FIG. 8 is a schematic diagram of a timing circuit alternate to timing circuit 104 shown in FIG. 6.

FIG. 8 is a schematic diagram of a timing circuit alternate to timing circuit 104 shown in FIG. 6. Gates 210 and 218 form a flip flop to eliminate difficulties in manufacturing and testing delay element 114 shown in FIG. 6. Corresponding lines are similarly numbered on FIGS. 6 and 8. Likewise, delay element 216 functionally corresponds to delay element 118; buffers 220 and 222 functionally correspond to buffers 120 and 110, respectively; and gate 214 functionally corresponds to gate 116.

In an alternate embodiment, the functions of timing circuits 104 and 204 are accomplished with additional and different circuitry in a modification to pump driver 16 according to logic design choices familiar to those having ordinary skill in the art. In such an embodiment, the modified-pump driver generates signals N1, L1, and H1 for CP1; N2, L2, and H2 for CP2; and so on for pumps CP3–4.

Figure 9:
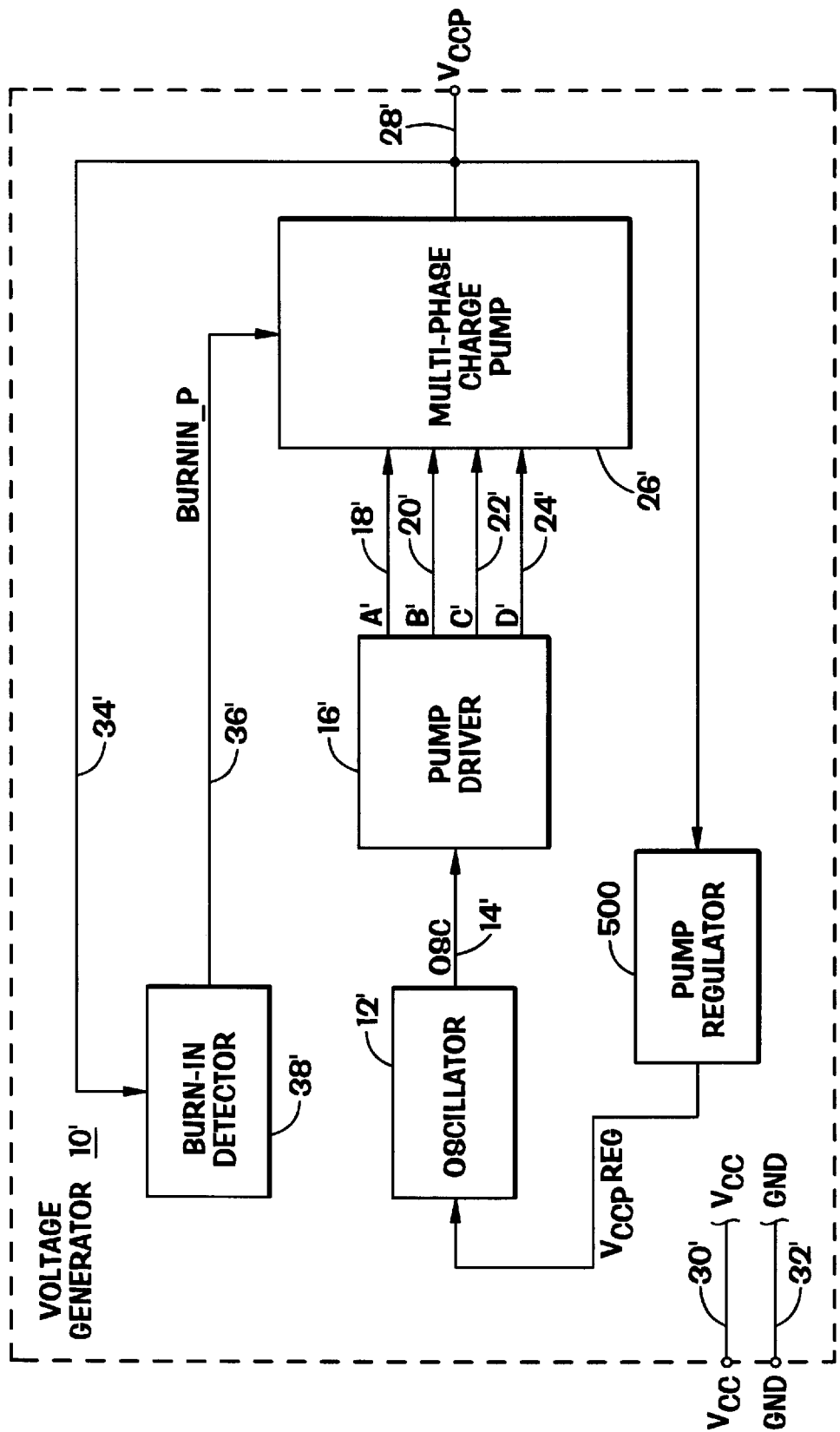
FIG. 9 is a functional block diagram of a second voltage generator for producing a positive $V_{CCP}$ voltage.

FIG. 9 is a functional block diagram of a second voltage generator 10' for producing a positive $V_{CCP}$ voltage, the generator having over-voltage protection circuitry. Because this $V_{CCP}$ voltage generator 10' is structurally similar to voltage generator 10 of FIG. 2–8, the $V_{CCP}$ voltage generator has been labelled 10' and elements similar to those discussed relative to voltage generator 10 have been identified with similar, but prime numerals.

Voltage generator 10' receives power signal $V_{CC}$ and reference signal GND on lines 30' and 32' respectively and includes an oscillator 12', a pump driver 16' and a multi-phase charge pump 26'. Oscillator 12' generates a timing signal OSC' coupled to pump driver 16' through line 14'. Pump driver 16' produces clock signals A', B', C', and D', which are coupled to the multi-phase charge pump 26' through lines 18', 20', 22' and 24' respectively. Multi-phase charge pump 26' in turn produces an output boosted voltage $V_{CCP}$ on output line 28'.

In addition, voltage generator 10' further includes a burn-in detector 38', which responds to signal $V_{CCP}$ on line 34', and a pump regulator 500, which monitors the value of $V_{CCP}$ and produces a signal VCCPREG coupled to the oscillator 12' to turn the oscillator 12' on or off. Burn-in detector 38' produces a BURNIN_P signal on line 36' coupled to the multi-phase charge pump 26'.

Figure 10:
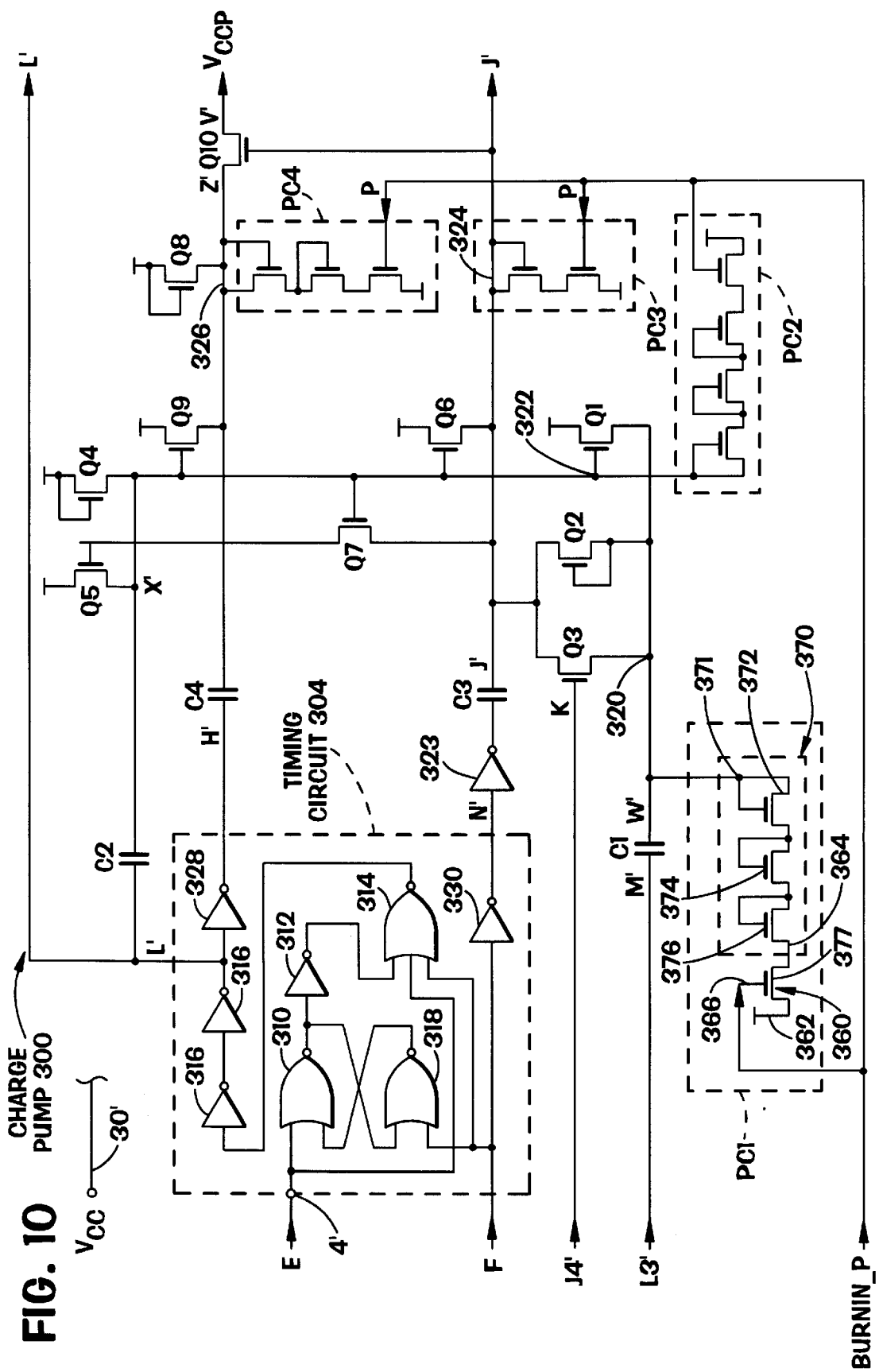
FIG. 10 is a schematic diagram of a charge pump 300 for the voltage generator of FIG. 9.

FIG. 10 is a schematic diagram of an exemplary configuration of a charge pump 300 suitable for use in the multi-phase charge pump 26' shown in FIG. 9 for producing a positive boosted voltage $V_{CCP}$. Charge pump 300 is similar to charge pump 100 illustrated in FIG. 6, but having a timing circuit 304 similar to the timing circuit 204 illustrated in FIG. 8. Similar elements are labelled with the same last two digits. Significant differences are that transistor terminals that were connected to ground in the schematic of FIG. 6 are now coupled to $V_{CC}$; that the phases of the pump are inverted (see inverter 323), and that high-voltage nodes, 320, 322, 324, and 326, are clamped during burn-in testing by protective circuits PC1, PC2, PC3, and PC4 respectively.

Timing circuit 304 includes gates 310 and 318 forming a flip-flop that acts as a delay element. The flip-flop and gate 316 cooperate as means for generating timing signal L'. Buffers 312, 320, and 322 provide logical inversion and increased drive capability. Delay element 316 ensures that signal N' falls before signal L' falls to preserve the effectiveness of signal J' at the end of the drive mode of the charge pump 300.

Charge pump 300 also includes a transfer circuit responsive to signals M' and N' for selectively transferring charge from the primary storage capacitor to the operational circuit (C1, C3, Q2, Q3, and Q10), a reset circuit, responsive to timing signal L', for establishing charges on each capacitor in preparation for a subsequent mode of operation (C2, Q1, Q6, Q7, and Q9), a transistor Q5 for resetting the reset pump C2, a start-up condition circuit including Q4 and Q8), a primary storage capacitor (C4), and a control circuit responsive to timing signal K' for generating a second timing signal J' (Q2 and Q3).

The transfer circuit includes a first capacitor C1 coupled across the input for signal L3' and the output for signal W' (node 320); a third capacitor C3 coupled across the logical inverse of the signal N' from the timing circuit 304 and the output of signal J' (node 324); a second transistor Q2 (a node-connected MOSFET) having a drain terminal coupled to node 324 and a source terminal coupled to node 320; a third transistor Q3 having a gate terminal coupled to input signal J4' (or K'), a drain terminal coupled to node 324, and a source terminal coupled to node 320; and a tenth transistor Q10 having a gate terminal coupled to node 324, a drain terminal coupled to a $V_{CCP}$ output, and a source terminal coupled to a node 326.

The reset circuit includes a second capacitor C2 coupled across the L' signal line from the timing circuit 304 and the node 322; a first transistor Q1 having a drain terminal coupled to $V_{CC}$, a gate terminal coupled to a node 322 (signal X'), and a source terminal coupled to node 320; a sixth transistor Q6 having a drain terminal coupled to $V_{CC}$, a gate terminal coupled to node 322, and a source terminal coupled to node 324; a seventh transistor Q7 having a gate terminal coupled to node 322, a source terminal coupled to node 326 (signal Z'), and a drain terminal coupled to node 324 (signal J'); and a ninth transistor Q9 having a gate terminal coupled to node 322, a drain terminal coupled to $V_{CC}$, and a source terminal coupled to node 326. Fifth transistor Q5 has a source terminal coupled to node 322, a gate terminal coupled to node 326, and a drain terminal coupled to $V_{CC}$. Q5 resets C2 when the charge pump 300 is in drive mode.

The start-up condition circuit includes a fourth transistor Q4 (a diode-connected MOSFET) having a gate and a drain terminal coupled to $V_{CC}$ and a source terminal coupled to node 322; and an eight transistor Q8 (a diode-connected MOSFET) having a gate and a drain terminal coupled to $V_{CC}$ and a source terminal coupled to node 326. Primary storage capacitor C4 is coupled across the output of signal H' from timing circuit 304 and the node 326 (signal Z'). Control circuit includes transistors Q2 and Q3.

In a preferred embodiment of charge pump 300, $V_{CC}$ is about 3.3 volts and $V_{CCP}$ is about 4.8 volts. During burn-in testing, $V_{CC}$ reaches 5.0 volts and $V_{CCP}$ approaches 6.5 volts. The transistors are all MOSFET with a $V_T$ of about 0.6 volts.

Protection circuit PC1 includes a switching element 360 and a voltage clamp 370. Switching element 360 is a MOSFET switching transistor having a drain terminal 364 (clamp terminal) connected to the voltage clamp 370, a source terminal 362 (clamping voltage terminal) coupled to a reference voltage ($V_{CC}$) source 30', and a gate terminal 366 (control terminal) connected to the BURNIN_P line 36'.

Voltage clamp 370 includes a chain of three diode-connected enhancement MOSFET transistors 372, 374, and 376 coupled in series. The drain terminal 371 of the first transistor 372 (the node terminal) is coupled to the high-voltage node 320, while the source terminal 377 of the last transistor 376 (the switch terminal) is coupled to the drain terminal 364 of the switching transistor 360.

During normal operation, the BURNIN_P signal is LOW (having a value lower than $V_{CC}$) and the switching transistor 360 is off, removing the protection circuit PC1 from the system so as not to affect the efficiency of the charge pump 300. During burn-in testing conditions, the BURNIN_P signal steps up to a value ($V_{CCP}$) higher than $V_{CC}$, causing switching transistor 360 to go into pinch-off mode, and allowing current ($I_{ds}$) to flow from the drain terminal 364 to the source terminal 362. Once $I_{ds}>0$ the voltage clamp 370 becomes part of the system and clamps down the voltage of the high-voltage node to $V_{CC}+V_{tswitch}+V_{t1}+\ldots+V_{tn}$ (where n is the number of diode-connected transistors and $V_{tx}$ is the voltage drop across each transistor) thus avoiding over-voltage damage.

Protective circuits PC2, PC3, and PC4 are similar to protective circuit PC1 and include a switching transistor and a voltage clamp. The number and the value of diode-connected transistors in each voltage clamp varies according to the expected over-voltage values of the high-voltage node and the desired clamping voltage. Protection circuits allow accurate burn-in testing of a variety of charge pump designs or of any other IC device having high-voltage nodes at risk of over-voltage damage, while preventing damage caused by over-voltages. The protection circuit can be manufactured as part of the IC device, thereby avoiding the need to add additional components or assembly steps. Finally, protection circuits do not affect the efficiency of the IC device during normal operation.

Figure 11:
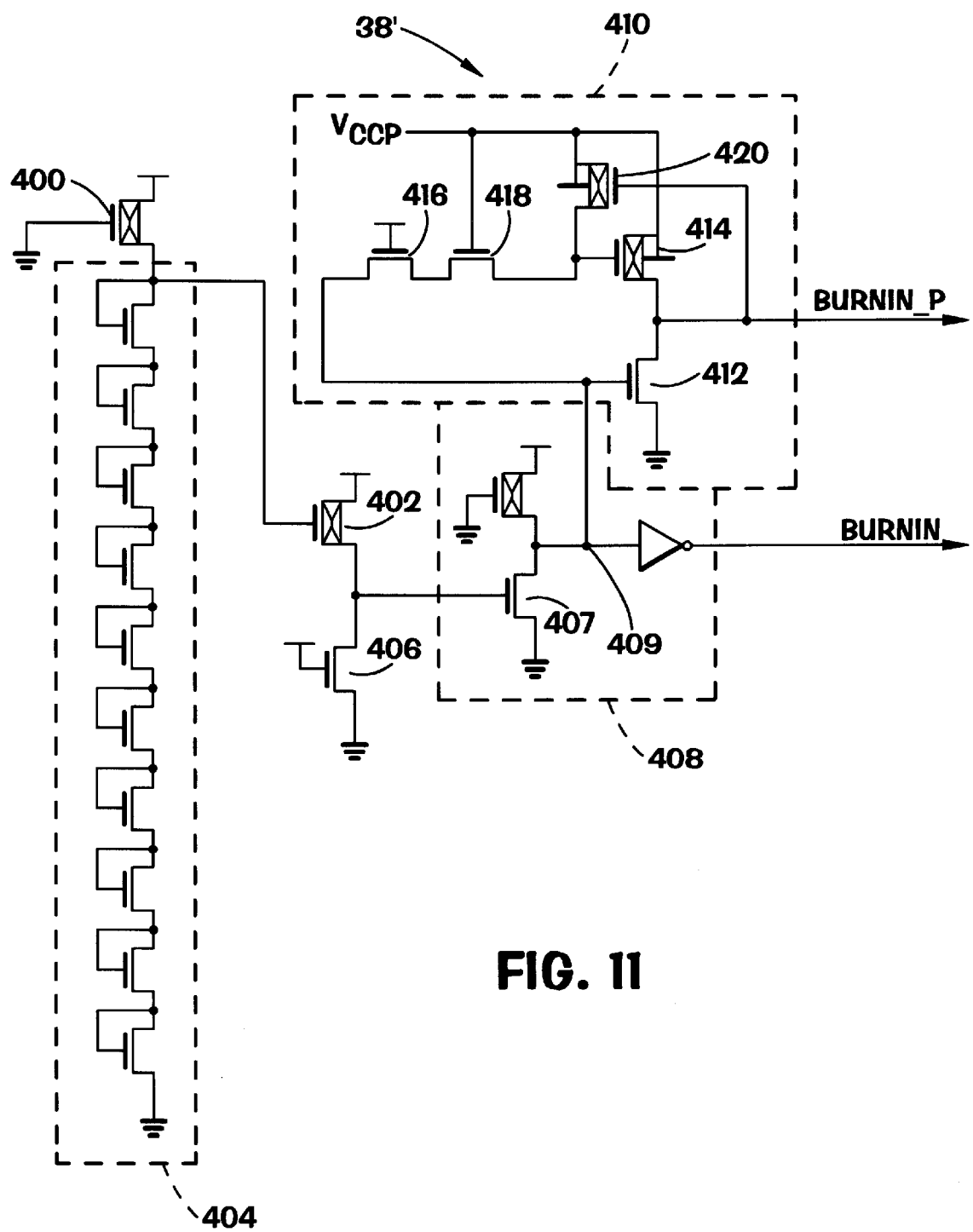
FIG. 11 is a schematic diagram of the burn-in detector shown in FIG. 9.

FIG. 11 is a schematic of a preferred embodiment of the burn-in detector 38' of FIG. 9. The burn-in detector 38' reacts to burn-in conditions to produce the BURNIN_P control signal for enabling the protective circuits.

The burn-in detector 38' includes a p-channel device 400 having a drain terminal set at $V_{CC}$, a gate terminal set to ground, and a source terminal coupled in series to a chain of n-channel diodes 404 coupled in series. The gate terminal of the first diode in the chain 404 is coupled to the gate terminal of a p-channel gate 402 having a drain terminal coupled to $V_{CC}$ and a source terminal coupled to an n-channel transistor 406 and to logic circuit 408. At low $V_{CC}$ values ($V_{CC}=3.3$ volts at normal operation), the diodes 404 are turned off, therefore leaving the drain terminal of the p-channel device 400 at $V_{CC}$, which drives the p-channel gate 402. P-channel 402 will be off and its drain terminal will be at ground because of the n-channel transistor 406. Under these conditions, transistor 407 is off, the voltage at node 409 is high and the BURNIN signal is low (logic zero).

Conversely, under burn-in conditions, $V_{CC}$ goes high (about 5 volts). $V_{CC}$ then raises the stack of n-channel diodes 404, which then overdrive the p-channel device 400, bringing the source terminal of the device 400 away from $V_{CC}$, which then turns on the p-channel gate 402. Turning the p-channel gate 402 on, overdrives the n-channel transistor 406 which turns on switching transistor 407. Once transistor 407 is on, the voltage on node 409 goes low and drives the logic circuit 408 to produce a BURNIN logic value of 1.

A high BURNIN value activates BURNIN_P gate 410 by turning off transistor 412. Ground then propagates through transistors 416 and 418 and turns on transistor 414, driving up the value of BURNIN_P to $V_{CCP}$. A value of BURNIN_P larger than $V_{CC}$ turns on the switching elements of the protective circuits PC1–PC4, thus activating the voltage clamps and preventing over-voltage damage. When BURNIN is low, transistor 412 is on, and transistor 414 is off, thus driving BURNIN_P close to ground and turning off the protective circuits PC1–PC4.

Figure 12:
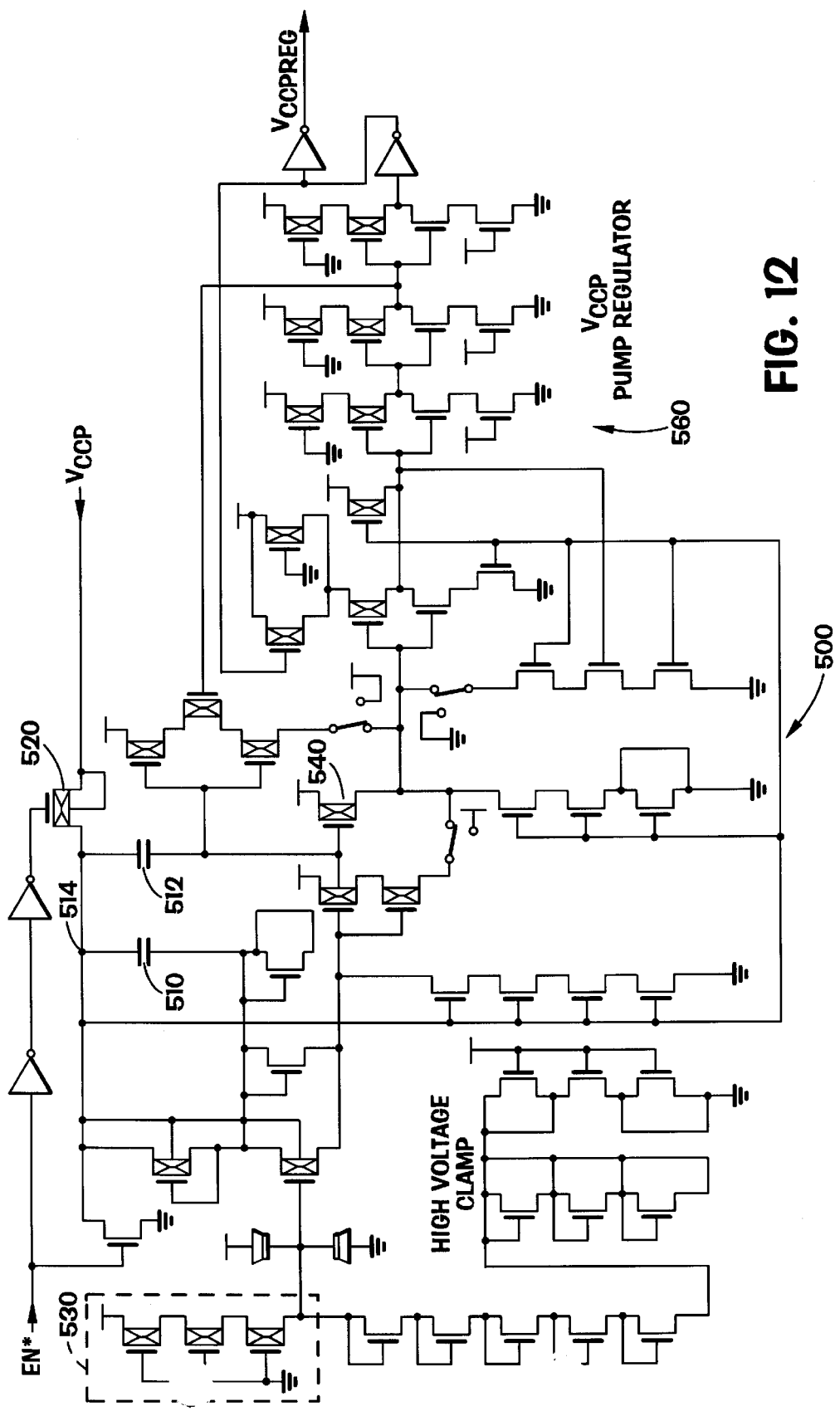
FIG. 12 is a schematic diagram of the $V_{CCP}$ pump regulator 500 of FIG. 9.

FIG. 12 is a schematic diagram of the pump regulator 500 of FIG. 9. Pump regulator 500 monitors $V_{CCP}$, and produces an output signal VCCPREG, which is used as a control signal for the oscillator 12'. In a preferred embodiment the charge pump has a $V_{CC}$ voltage of 3.3 volts and a $V_{CCP}$ voltage of 4.8 volts during normal operation.

The pump regulator 500 is a set voltage regulator having a reference voltage for turn-on (turn-on voltage=4.7 volts) and a reference voltage for turn-off (turn-off voltage 4.9 to 5.0 volts), having therefore a built-in hysteresis. Basically, the regulator behaves as a comparator with hysteresis. Anytime $V_{CCP}$ goes below the turn-on voltage, the pump regulator produces a high VCCPREG signal which activates the oscillator 12', thus cycling the charge pump and raising $V_{CCP}$. Signal VCCPREG remains high until the value of $V_{CCP}$ rises above the turn-off voltage. The regulator 500 then drives VCCPREG low, which turns OFF the oscillator 12'. The regulator 500 then resets itself, and waits until the next turn-on cycle.

Pump regulator 500 includes two n-well capacitors 510 and 512, each having a first plate coupled to node 514 and a second plate. When the EN enable signal is high, the transistor E14 is on, and the voltage at node 514 equals $V_{CCP}$. The voltage of the second plate of the n-well capacitors is set by diode chain 530. When the second plate on the n-well capacitors 510 and 512 goes to low, the p-channel transistor 540 turns on and propagates through a series of inverters 560, which produce signal VCCPREG to turn the oscillator on. When $V_{CCP}$ crawls up high enough again, the voltage of the second plate of capacitor 512 rises and to turns off p-channel device 540, thus driving VCCPREG low.

Practice of the present invention includes use of a method in one embodiment that includes the steps (numbered solely for convenience of reference):

(1) maintaining a first voltage on a first plate of a first capacitor while storing a first charge on a second plate of the first capacitor;

(2) stepping the voltage on the first plate of the first capacitor thereby developing a first stepped voltage on the second plate of the first capacitor;

(3) coupling the first stepped voltage to a pass transistor;

(4) maintaining a second voltage on a first plate of a second capacitor while storing a second charge on a second plate of the second capacitor;

(5) stepping the voltage on the first plate of the second capacitor thereby developing a second stepped voltage on the second plate of the second capacitor;

(6) coupling the second stepped voltage to the first plate of a third capacitor;

(7) stepping the voltage on the second plate of the third capacitor thereby developing a third stepped voltage on the first plate of the third capacitor; and (8) coupling the third stepped voltage to a control terminal of the pass transistor thereby enabling the first stepped voltage to power the circuit.

The method in one embodiment is performed using some of the components and signals shown in FIGS. 6 and 7. Cooperation of oscillator 12, pump driver 16, timing circuit 104, capacitor C4, transistor Q8, and signals H and Z accomplish step (1). Operation of timing circuit 104 to provide signal H accomplishes the operation of stepping in step (2). In step (2) the first stepped voltage is a characteristic value of signal Z. Signal Z is coupled by line 158 to transistor Q10 accomplishing step (3).

Cooperation of capacitor C1, transistor Q1 and signals M and L accomplish step (4). These components cooperate as first generating means for providing a voltage W by time T22. Cooperation of timing circuit 104 of another charge pump to provide signal L therein and consequently signal M herein accomplishes the operation of stepping in step (5). In step (5) the stepped voltage is a characteristic value of signal W.

Cooperation of timing circuit 104 of another charge pump to provide signals N and J therein and consequently signal K herein along with transistors Q2 and Q3 accomplish step (6) with respect to capacitor C3. These circuits and components cooperate as means responsive to a timing signal for selectively coupling the first generating means to a second generating means.

Cooperation of oscillator 12, pump driver 16, timing circuit 104, capacitor C3, and signal N accomplish step (7). These components cooperate as a second generating means for providing another stepped voltage. The stepped voltage is a characteristic value of signal J at time T28. The stepped voltage is outside the range of power, i.e., $V_{CC}$, and reference, i.e., GND, voltages applied to integrated circuit 8 of which charge pump 100 is a part. Finally, line 136 couples signal J to the gate of transistors Q10, accomplishing step (8).

In the method discussed above, steps 1–3 occur while steps 7–8 are occurring as shown in FIG. 7 by the partial overlap in time of signals H and N.

The foregoing description discusses preferred embodiments of the present invention, which may be changed or modified without departing from the scope of the present invention.

For example, N-channel FETs discussed above may be replaced with P-channel FETs (and vice versa) in some applications with appropriate polarity changes in controlling signals as required. Moreover, the FETs discussed above generally represent active devices which may be replaced with bipolar or other technology active devices.

Still further, those skilled in the art will understand that the logical elements described above may be formed using a wide variety of logical gates employing any polarity of input or output signals and that the logical values described above may be implemented using different voltage polarities. As an example, an AND element may be formed using AND gate or an NAND gate when all input signals exhibit a positive logic convention or it may be formed using an OR gate or a NOR gate when all input signals exhibit a negative logic convention.

These and other changes and modifications known among those skilled in the art are intended to be included within the scope of the present invention.

While for the sake of clarity and ease of description, several specific embodiments of the invention have been described; the scope of the invention is intended to be measured by the claims as set forth below. The description is not intended to be exhaustive or to limit the invention will be apparent in light of the disclosure to one of ordinary skill in the art to which the invention applies.

The words and phrases used in the claims are intended to be broadly construed. A "system" refers generally to electrical apparatus and includes but is not limited to a packaged integrated circuit, an unpackaged integrated circuits or both, a microprocessor, a microcontroller, a memory, a register, a flip-flop, a logic device, a charge-coupled device, combinations thereof, and equivalents.

The terms "charge pump" and "pump circuit" include, for example, a voltage doubler, a switching circuit, a voltage inverter, a level shifter, and a switching power supply whose operation includes charge storing and stepped voltage techniques.

A "signal" refers to mechanical and/or electromagnetic energy conveying information. When elements are coupled, a signal can be conveyed in any manner feasible in light of the nature of the coupling. For example, if several electrical conductors couple two elements, then the relevant signal comprises the energy on one, some, or all conductors at a given time or time period. A signal is coupled to an element regardless of intervening components when an operation of the element is responsive to the signal. When a physical property of a signal has a quantitative measure and the property is used by design to control or communicate information, then the signal is said to be characterized by having a "value." The amplitude may be instantaneous or an average. For a binary (digital) signal, the two characteristic values are called logic levels, "high" and "low".

The terms "timing" signal, "clock" signal, and "control" signal are sued interchangeably in the specification and claims to meaningfully identify a particular signal without describing or limiting the function performed by the signal in any manner whatsoever. Consequently, the functions implied by the word "timing", "clocking", and "controlling" herein are equivalent.

Additional objects, features, and advantages of the present invention will become more apparent by referring to the following detailed description of the invention in connection with the accompanying drawings.

Although a preferred embodiment of this invention has been described hereinabove in some detail, it will be appreciated that a variety of embodiments will be readily available to a person designing such shingles for a specific end use. The description of this invention is not intended to be limiting on this invention, but is merely illustrative of a preferred embodiment of this invention. Other apparatus and components which incorporate modifications or changes to that which has been described herein are equally included within the scope of the appended claims.

What is claimed is:

1. A method of protecting a high-voltage node of an integrated circuit during burn-in testing, the method comprising the acts of:

(a) generating a burn-in signal in response to a burn-in voltage being applied to the integrated circuit;

(b) delivering the burn-in signal to a switching device, the switching device generating a switching signal in response to receiving the burn-in signal; and (c) delivering the switching signal to activate a voltage clamp to clamp the high voltage node to a voltage level lower than the burn-in voltage.

2. The method, as set forth in claim 1, wherein act (a) comprises the act of detecting the burn-in voltage being applied to the integrated circuit.

3. The method, as set forth in claim 2, wherein act (a) comprises the act of using a burn-in detector to detect the burn-in voltage being applied to the integrated circuit.

4. The method, as set forth in claim 3, wherein act (a) comprises the act of generating the burn-in signal using the burn-in detector.

5. A method of protecting a high-voltage node of an integrated circuit during burn-in testing, the method comprising the acts of:
 (a) providing a burn-in detector to detect a burn-in signal being applied to the integrated circuit and to generate a burn-in signal in response thereto;
 (b) providing a protection circuit having a first node operatively coupled to the high-voltage node and having a second node operatively coupled to a switch terminal; and
 (c) providing a switching device operatively coupled to the switch terminal of the protection circuit, the switching device being operable to activate the protection circuit to maintain the high-voltage node at a voltage level lower than the burn-in voltage in response to the switching device receiving the burn-in signal.

6. The method, as set forth in claim 5, wherein act (a) comprises the act of providing the burn-in detector on the integrated circuit.

7. The method, as set forth in claim 5, wherein act (b) comprises the act of providing the protection circuit on the integrate circuit.

8. The method, as set forth in claim 5, wherein act (c) comprises the act of providing the switching device on the integrated circuit.

9. The method, as set forth in claim 5, wherein act (b) comprises the act of providing the protection circuit in the form of a voltage clamp.

10. The method, as set forth in claim 5, wherein act (c) comprises the act of providing the switching device in the form of a transistor.

11. A method of protecting an integrated circuit charge pump for supplying an operating voltage to a system, the charge pump having a high-voltage node, comprising the acts of:
 (a) generating a burn-in signal in response to a burn-in voltage being applied to the charge pump;
 (b) delivering the burn-in signal to a switching device, the switching device generating a switching signal in response to receiving the burn-in signal; and
 (c) delivering the switching signal to activate a protection circuit to maintain the high voltage node at a voltage level lower than the burn-in voltage.

12. The method, as set forth in claim 11, wherein act (a) comprises the act of detecting the burn-in voltage being applied to the charge pump.

13. The method, as set forth in claim 12, wherein act (a) comprises the act of using a burn-in detector to detect the burn-in voltage being applied to the charge pump.

14. The method, as set forth in claim 13, wherein act (a) comprises the act of generating the burn-in signal using the burn-in detector.

15. A method of protecting a plurality of high voltage nodes of an integrated circuit, the method comprising the acts of:
 (a) generating a burn-in signal in response to a burn-in voltage being applied to the integrated circuit;
 (b) delivering the burn-in signal to at least one switching device, the at least one switching device generating at least one switching signal in response to receiving the burn-in signal; and
 (c) delivering the at least one switching signal to activate at least one protection circuit to maintain the plurality of high voltage nodes at a voltage level lower than the burn-in voltage.

16. The method, as set forth in claim 15, wherein act (a) comprises the act of detecting the burn-in voltage being applied to the integrated circuit.

17. The method, as set forth in claim 16, wherein act (a) comprises the act of using a burn-in detector to detect the burn-in voltage being applied to the integrated circuit.

18. The method, as set forth in claim 17, wherein act (a) comprises the act of generating the burn-in signal using the burn-in detector.

19. The method, as set forth in claim 15, wherein act (b) comprises the act of delivering the burn-in signal to a plurality of switching devices, each of the plurality of switching devices generating a respective switching signal in response to receiving the burn-in signal.

20. The method, as set forth in claim 19, wherein act (c) comprises the act of delivering the respective switching signals a plurality of protection circuits, each of the plurality of protection circuits being coupled to a respective one of the plurality of high voltage nodes, to activate the plurality of protection circuits to maintain the plurality of high voltage nodes at a voltage level lower than the burn-in voltage.

* * * * *